Nov. 18, 1958 R. E. LEAHY 2,861,183

ELECTRONIC SWITCH MODULATOR

Filed Dec. 31, 1954

INVENTOR
ROBERT E. LEAHY
BY R. J. Craddock
ATTORNEY 2,861,183

ELECTRONIC SWITCH MODULATOR

Robert Emmett Leahy, Hicksville, N. Y., assignor to Sperry Rand Corporation, a corporation of Delaware Application December 31, 1954, Serial No. 479,085

10 Claims. (Cl. 250—27)

The present invention relates to electronic switch modulator circuits.

It is an object of the present invention to provide an improved full-wave switch modulator circuit of simplified design having a high impedance input and high gain.

It is a further object of the present invention to provide a system as aforedescribed having a single-ended output, i. e., an output having one of its terminals at ground potential.

The foregoing objects are attained by the provision of means having two output circuits between which a differential voltage is developed in response to input signal information supplied to said means, and a pair of balanced, grid-controlled vacuum tubes having their cathodes coupled to gether and to ground through a common cathode load impedance. The plates of the foregoing vacuum tubes are coupled to the aforementioned two output circuits, respectively, so that the aforementioned differential voltage appears between said plates. The grids of the vacuum tubes are coupled to a switching reference voltage source for alternately cutting off one and then the other of said pair of vacuum tubes at a predetermined frequency rate. Such an arrangement may be utilized as a full-wave switch modulator for providing an alternating or unidirectional voltage output (depending on the nature of the input signal information) across the aforementioned cathode load impedance, the magnitude and phase or polarity of the output being functions of the input signal information.

Figure 1:
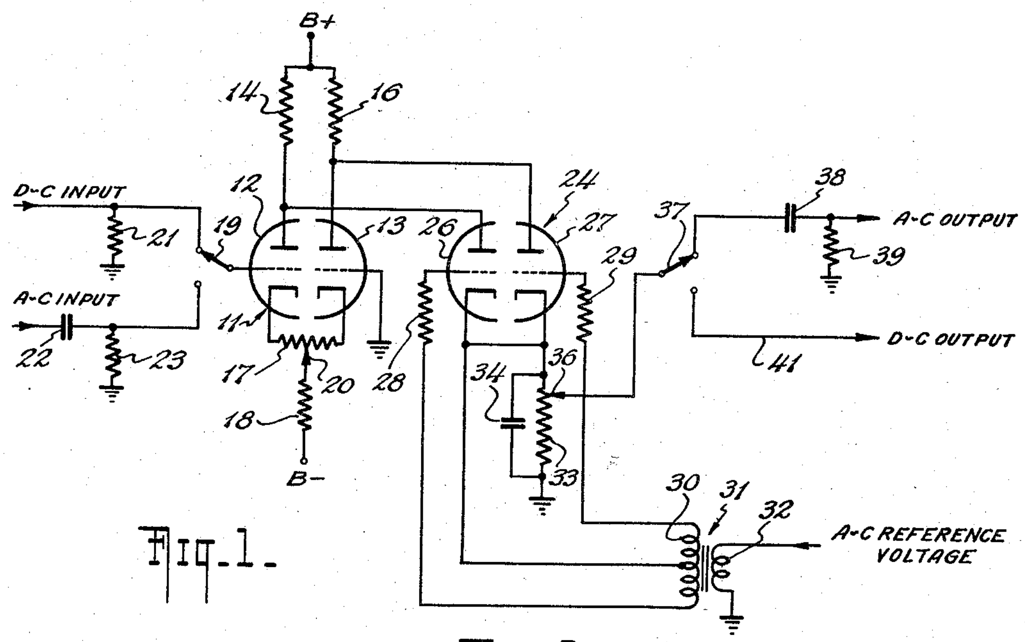

Other features and advantages of the present invention will become apparent to those skilled in the art from the detailed description thereof taken in connection with the accompanying drawings in which:

Fig. 1 is a schematic illustration of an electronic circuit utilizing the principles of the present invention; and Figs. 2*a* through 2*f* are voltage waveforms which occur between various points in the circuit of Fig. 1 with a unidirectional signal voltage input, for example.

Referring to Fig. 1, a paraphase amplifier 11 is shown as including twin triode vacuum tubes 12 and 13 whose electrodes are supported within the same vacuum envelope, for example. The plates of tubes 12 and 13 are coupled to a source of positive power supply indicated by B+ through parallel connected load resistors 14 and 16 having substantially the same resistance values. The cathodes of tubes 12 and 13 are connected together through a resistor 17, the grid of tube 13 being grounded.

A further resistor 18 is provided in the cathode circuit of tubes 12 and 13, having one end connected to a negative source of power supply indicated by B— and its other end provided with a tap 20 for adjustably connecting resistor 18 to resistor 17 in the vicinity of the electrical mid-point thereof. The resistor 18 should have a large value of resistance equal to that of plate load resistor 14 or 16, for example. The tap 20 of resistor 18 is adjustable along resistor 17 for insuring that the plate voltages of tubes 12 and 13 are equal during quiescent operating conditions for the tubes. Resistor 17 should have a very small value of resistance compared with that of resistor 18 so that the cathode to ground potentials of tubes 12 and 13 are substantially the same as the potential between tap 20 and ground.

The positive and negative sources of power supply indicated in Fig. 1 should be chosen so that the quiescent cathode voltages of tubes 12 and 13 are above ground potential, the grids of these tubes being at ground potential during quiescence. The grid to cathode bias provided for tube 12 should be at a proper value so that positive excursions of an input unidirectional signal voltage of steady or varying magnitude supplied to the grid of tube 12 through a switch 19 from a grounded shunt resistor 21 or positive excursions of an input alternating signal voltage supplied to the grid of tube 12 through switch 19 from an R–C input circuit comprising a coupling capacitor 22 and a grounded shunt resistor 23 will not cause grid current to flow in tube 12. Similarly, negative excursions of an input signal voltage should not cause tube 12 to be cut off.

A balanced circuit 24 is shown as including twin triode vacuum tubes 26 and 27 whose electrodes are supported within the same vacuum envelope, for example. The plates of tubes 26 and 27 are connected directly to the plates of tubes 12 and 13, respectively.

The grids of tubes 26 and 27 are coupled through large resistors 28 and 29 of equal resistance value to the opposite end terminals of a center-tapped secondary winding 30 of an audio frequency transformer 31 having a single-ended primary winding 32 for receiving a sine wave alternating reference voltage at a predetermined audio frequency, for example. The cathodes of tubes 26 and 27 are connected together and to the center-tap (electrical mid-point) of the winding 30 of transformer 31 and, thus, to the grids of tubes 26 and 27. When a push-pull reference voltage is supplied to the grids of tubes 26 and 27, the cathodes of these tubes are neutral with respect to such a voltage since they are connected directly to the electrical mid-point of transformer winding 30.

The cathodes of tubes 26 and 27 are connected to ground through load impedance means comprising resistor 33 having a large value of resistance of the order of ten times that of either of plate load resistors 14 and 16, for example. The cathode voltage of tubes 26 and 27 should be well above ground during quiescence so as to enable a large negative going as well as a large positive going output to be obtained therefrom when a maximum signal voltage input of either polarity is supplied to the grid of tube 12. A small by-pass capacitor 34 is provided across resistor 33 for lowering the cathode to ground impedance of tubes 26 and 27 for alternating currents so that small variations in the resultant plate current of these tubes caused by the application of the aforementioned push-pull voltage to the grids thereof will have substantially no effect on the cathode to ground voltage of tubes 26—27. The capacitor 34 may have a reactance which is approximately one-quarter of the resistance of resistor 33 at the frequency of the push-pull reference voltage, for example.

An adjustable tap 36 is provided along cathode resistor 33 for deriving an output voltage of desired gain therefrom. A switch 37 is connenected to tap 36 for supplying an R–C coupling circuit comprising a capacitor 38 and a grounded shunt resistor 39 with a full-wave amplitude modulated alternating output voltage when a unidirectional input signal voltage is supplied to the grid of tube 12 through switch 19. Alternatively, switch 37 may be adjusted so as to supply an amplitude modulated unidirectional output voltage from the cathode resistor 33 to an output lead 41 when an alternating signal voltage is supplied to the grid of tube 12 through switch 19.

In operation, the push-pull reference voltage at the grids of tubes 26 and 27 causes the grid of tube 26 to be driven positive and the grid of tube 27 to be driven negative on one-half cycle of the reference voltage, a reverse situation obtaining on the next half cycle. The resultant grid to cathode voltages of the two tubes 26—27, which follow first and second alternating switching voltages of opposite phase for the two tubes, respectively, should be of such magnitude that whenever the grid of either tube is driven in a negative direction current in the tube is cut-off. Also, whenever the grid of either tube is driven in a positive direction grid current should flow.

Figure 2A:
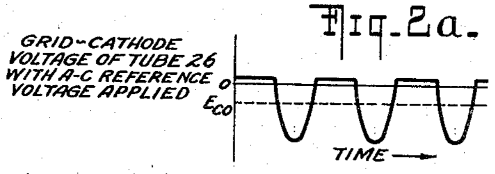
Figure 2B:
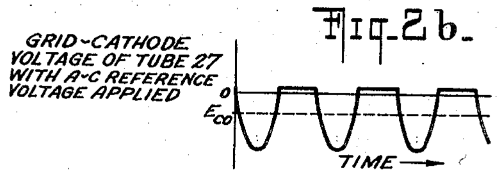

The resultant plate current of the two tubes 26 and 27 which passes through cathode resistor 33 should remain substantially the same during the time when the push-pull reference voltage is supplied so that a substantially constant cathode to ground voltage for tubes 26 and 27 is maintained with no signal voltage input at the grid of tube 12. The voltage waveform between the grid and cathode of each of tubes 26 and 27 versus time with the application of the aforedescribed push-pull reference voltage is illustrated in the graphs of Fig. 2*a* and Fig. 2*b*, respectively. The voltage waveforms of Figs. 2*a* and 2*b* are 180 degrees out of phase.

Switch 19 should be closed to connect resistor 21 to tube 12 and switch 37 closed to connect the R-C circuit 38—39 to cathode resistor 33 when a unidirectional input signal voltage is utilized in the circuit of Fig. 1. If a unidirectional input signal voltage of positive polarity is supplied to the grid of tube 12 from across resistor 21, for example, tube 12 becomes more conductive and its plate voltage drops. The resultant increased flow of current in tube 12 passes through cathode resistor 18 so that the cathode voltage of tube 13 rises. The rise in the cathode voltage of tube 13 is degenerative and causes less current to flow through tube 13 so that its plate voltage rises.

If resistor 18 is of the proper size, the magnitude of the degenerative voltage developed across it should be equal to approximately half of the magnitude of the signal applied to the grid of tube 12. Thus, the net grid to cathode voltages of tubes 12 and 13 are of the same magnitude and of opposite polarity relative to grid to cathode voltages with no signal voltage input so that the plate voltage of tube 13 increases upon receipt of the aforementioned positive unidirectional input signal voltage by the same amount that the plate voltage of tube 12 decreases. Thus, a differential voltage is provided between the plate output circuits of tubes 12 and 13 whose magnitude is a function of the magnitude of the unidirectional input signal voltage. The tubes 12 and 13 operate in a similar manner for a negative input signal voltage, the polarity of the differential output voltage changing with a change in polarity of the input signal voltage.

Figure 2C:
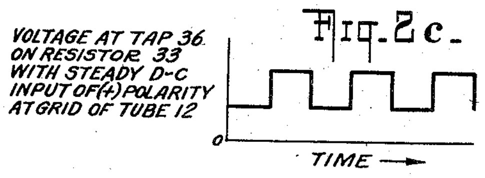
Figure 2E:
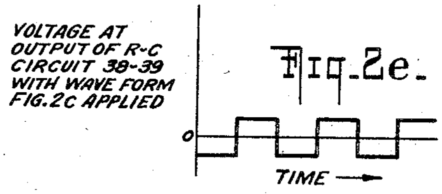
Figure 2D:
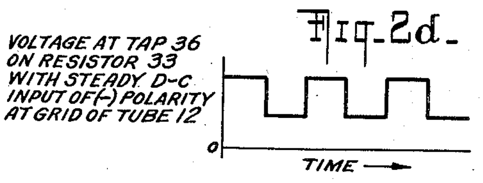

If the unidirectional input signal voltage applied to the grid of tube 12 is positive so as to cause the plate voltage of tubes 12 and 26 to decrease and the plate voltage of tubes 13 and 27 to rise, more current flows through tube 27 when it conducts on a positive half cycle of the switching voltage applied to its grid than flows through tube 26 on a positive half cycle of the switching voltage applied to its grid. Thus, the current through cathode load resistor 33 changes on each half cycle of the push-pull reference voltage so that a modulated voltage waveform as shown in Fig. 2*c* is provided between the cathodes of tubes 26 and 27 and ground. The ordinate in Fig. 2*c* represents the same point in time as the ordinates in Figs. 2*a* and 2*b*. If a unidirectional input voltage of negative polarity is applied to the grid of tube 12, the voltage waveform across resistor 33 reverses its phase as is shown in Fig. 2*d*.

The peak to peak magnitude of the alternating voltage provided across cathode resistor 33 is substantially a direct function of the magnitude of the undirectional input signal voltage supplied to the grid of tube 12, full-wave modulation being provided with the frequency of the alternating voltage developed across resistor 33 corresponding to the frequency of the push-pull reference voltage supplied to the grids of tubes 26—27. The modulation envelope of the voltage waveform provided across cathode resistor 33 will follow a steady undirectional modulation input signal voltage supplied to the grid of tube 12 or a varying unidirectional input signal voltage of lower frequency than that of the push-pull reference voltage frequency. The phase of the aforementioned waveform is always a function of the polarity of the input signal voltage at the grid of tube 12 with respect to ground.

Figure 2F:
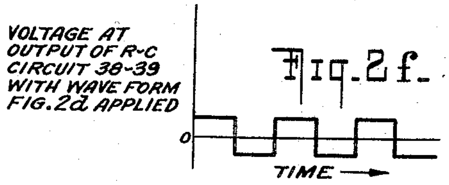

The tap 36 is adjustable along cathode resistor 33 for obtaining any fraction of the alternating voltage thereacross. The switch 37 is coupled to the R-C circuit 38—39 for removing the positive D.-C. component of the voltage waveform across cathode resistor 33. Thus, a single ended alternating output voltage of reversible phase is provided across resistor 39 as is shown in Fig. 2*e* and Fig. 2*f* in response to a unidirectional input signal voltage of one or an opposite polarity with respect to ground. Since the output voltage is single-ended, it can be readily applied to a single-ended load circuit such as a cathode follower, for example.

If it is desired to utilize the circuit in Fig. 1 for receiving an alternating input signal voltage of a frequency corresponding to that of the push-pull input to the grids of tubes 26—27, the switch 19 is adjusted to connect the R-C input coupling circuit 22—23 to the grid of tube 12. At this time the switch 37 should be adjusted for coupling the D.-C. output lead 41 to the cathode resistor 33 for tubes 26—27.

An alternating input signal voltage at the grid of tube 12 from the R-C circuit 22—23 causes a push-pull or alternating differential voltage to be provided between the plates of tubes 12 and 13 and, thus, the plates of tubes 26 and 27. The magnitude and phase of the aforementioned differential voltage are functions of the magnitude and phase of the input signal voltage, respectively. The aforementioned differential voltage is the difference between an alternating voltage provided at the plate of tube 12 and an alternating voltage of equal magnitude and opposite phase provided at the plate of tube 13 as a result of the alternating input signal voltage at the grid of tube 12.

If the tubes 26 and 27 are alternatively switched by a push-pull reference voltage as before so that current in one and then the other is cut-off with grid current flowing in a conducting tube, the output voltage across cathode resistor 33 is substantially unidirectional and of a certain magnitude when no signal voltage input is supplied to the grid of tube 12. If an alternating signal voltage of a frequency corresponding to that of the push-pull reference voltage is supplied to the grid of tube 12, a unidirectional voltage of different effective magnitude relative to a no signal voltage input condition is provided across resistor 33 except when such a signal voltage is in phase quadrature with the push-pull reference voltage.

If an input alternating signal voltage at the grid of tube 12 is in phase with or 180 degrees out of phase with the push-pull reference voltage, the magnitude and phase of the signal voltage being functions of certain intelligence, a unidirectional output is provided across cathode resistor 33 of tubes 26 and 27. The magnitude of such an output is a function of the magnitude of the input alternating signal voltage, the polarity of the output relative to a voltage across resistor 33 with no signal voltage input reversing with a phase reversal of the input signal voltage.

If the phase of an input alternating signal voltage input is a function of certain intelligence, the magnitude thereof being constant, the circuit of Fig. 1 may also be employed for providing a unidirectional output whose magnitude is a function of the phase of an input signal voltage relative to the push-pull reference voltage. A quadrature phase relationship results in a unidirectional output which is substantially the same as when no signal voltage input is supplied to the grid of tube 12.

When a unidirectional signal voltage is supplied to the grid of tube 12 the circuit shown in Fig. 1 effectively operates as a modulator. When an alternating signal voltage is supplied, the circuit effectively operates as a demodulator. However, since there is a modulation function provided with either type of input signal voltage, it is intended that the word "modulator" as used in the specification and appended claims be generic to either type of operation.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An electronic modulator, comprising signal information supply means, means having first and second output circuits for providing a differential voltage therebetween in response to input signal information supplied thereto from said supply means, a balanced pair of vacuum tubes each having a plate, grid and cathode, means coupled to the grids of said tubes for supplying a push-pull reference voltage thereto for alternately biasing one tube and then the other below cut-off, said last-named means being isolated and separate from said signal information supply means, means coupling the plates of said tubes to said first and second output circuits of said first-named means, respectively, for receiving said differential voltage therefrom, means coupling the cathodes of said tubes together, and load impedance means coupled between said cathodes and ground for providing an output voltage thereacross whose magnitude is a predetermined function of said input signal information, said push-pull reference voltage supplying means having an electrical mid-point connected between said load impedance means and the cathodes of said pair of vacuum tubes.

2. An electronic modulator, comprising first and second balanced vacuum tubes each having a plate, grid and cathode, means coupling the cathodes of said tubes together, a common cathode load impedance connected between said last-named means and ground, a push-pull circuit arrangement having first and second output terminals connected to the grids of said tubes, respectively, said push-pull circuit arrangement having an electrical mid-point coupled to the connection between said load impedance and the cathodes of said tubes for supplying said grids with balanced alternating switching voltages of opposite phase, and means for supplying the plates of said vacuum tubes with a differential voltage, whereby a single-ended output voltage is provided across said cathode load impedance between said electrical mid-point and ground whose magnitude is a predetermined function of said differential voltage.

3. An electronic modulator, comprising signal information supply means, a paraphase amplifier circuit for providing a differential voltage in response to an input signal voltage supplied thereto from said supply means, a pair of vacuum tubes each having a plate, grid and cathode, means coupling the plates of said vacuum tubes to said amplifier circuit for receiving said differential voltage therefrom, means coupled to the grids of said tubes for supplying a push-pull reference voltage thereto for alternately biasing one of said vacuum tubes and then the other below cut-off, means coupling the cathodes of said tubes together, said last-named means being isolated and separated from said signal information supply means, and output load impedance means coupled between said cathodes and ground, said push-pull reference voltage supplying means having an electrical mid-point connected between said load impedance means and the cathodes of said pair of vacuum tubes.

4. An electronic modulator, comprising a paraphase amplifier including a first pair of cathode-coupled vacuum tubes, a first one of said pair of tubes having a control grid for receiving an input signal voltage, the second one of said pair of tubes having a grounded control grid, each of said tubes having a plate and output load therefor so as to provide a differential voltage between the plates of said tubes in response to an input signal voltage supplied to the control grid of said first one of said tubes, a second pair of cathode coupled vacuum tubes each including a plate connected to a respective plate of said first pair of vacuum tubes, a source of balanced switching voltage having an electrical mid-point connected to the cathodes of said second pair of vacuum tubes, said second pair of vacuum tubes each having a grid connected to a respective end terminal of said source for receiving an alternating switching voltage so as to alternately bias one of said second pair of vacuum tubes substantially below cut-off at a predetermined frequency while the other is biased for grid current flow, and output load means coupled between said electrical mid-point at the cathodes of said second pair of vacuum tubes and ground.

5. An electronic modulator, comprising a first pair of cathode-coupled vacuum tubes each having a plate, grid and cathode, plate load resistor means of substantially the same resistance value for each of said tubes, an input terminal for connection to a source of power supply for said tubes, said resistor means being coupled together in parallel relationship with said input terminal, the grid of one of said tubes being grounded, the grid of the other of said tubes being adapted to receive an input signal voltage, common cathode resistor means coupled between said cathodes and ground for alternating voltages, said first pair of vacuum tubes comprising means for providing a differential voltage between the plates of said tubes in response to an input signal voltage at the grid of said other of said tubes, the magnitude of said differential voltage being a function of the magnitude of said input signal voltage, a second pair of cathode-coupled vacuum tubes each having a plate, grid and cathode, means for supplying a push-pull alternating voltage to said second pair of tubes between the grids thereof for alternately cutting off plate current flow in one and causing grid current to flow in the other of said second pair of tubes, said last-named means having an electrical mid-point connected to the cathodes of said second pair of tubes, means coupling respective plates of said second pair of tubes to respective plates of said first pair of tubes, and cathode output load impedance means coupled between said electrical mid-point at the cathodes of said second pair of tubes and ground.

6. An electronic modulator, comprising input unidirectional voltage coupling means, means connected to said last-named means for providing a differential voltage between first and second output loads therefor in response to an input unidirectional signal voltage supplied thereto by said coupling means, the magnitude and polarity of said differential voltage being functions of the magnitude and polarity of said input signal voltage, respectively, a balanced arrangement of first and second vacuum tubes having plates, grids and coupled cathodes, means coupling the plates of said vacuum tubes to said first and second output loads of said last-named means, respectively, for receiving said differential voltage, a push-pull circuit having end terminals coupled to the grids and an electrical mid-point coupled to the cathodes of said vacuum tubes for alternately biasing first one and then the other of said tubes below cut-off at a predetermined frequency, and load means coupled between the electrical mid-point at the cathodes of said tubes and ground, whereby an alternating output voltage of a frequency corresponding to said predetermined frequency is provided across said load means in response to an input unidirectional signal voltage supplied to said first-named means, the magnitude and phase of said output voltage being functions of the magnitude and polarity of said input signal voltage, respectively.

7. An electronic circuit for changing a unidirectional input signal voltage to an alternating output voltage, comprising a paraphase amplifier having input means and first and second output load means for providing a unidirectional differential output voltage between first and second output terminals of said first and second load means, respectively, in response to a unidirectional signal voltage supplied to said input means, first and second balanced vacuum tubes each having a plate, grid and cathode, means coupling the cathodes of said vacuum tubes together, cathode load means between said last-named means and ground, means coupling the plates of said first and second tubes to said first and second output terminals of said paraphase amplifier, respectively, a balanced circuit having points on opposite sides of an electrical mid-point thereof coupled to respective ones of the grids of said first and second tubes for supplying said grids with balanced alternating switching voltages of opposite phase, and means coupling the electrical mid-point of said balanced circuit to the common cathode connection of said first and second vacuum tubes, whereby an alternating output voltage is provided across said cathode load impedance of said balanced vacuum tubes whose magnitude and phase are functions of the magnitude and polarity of a unidirectional input signal voltage supplied to the input means of said paraphase amplifier.

8. An electronic circuit for changing an alternating input signal voltage into a unidirectional output voltage, comprising a paraphase amplifier, an alternating voltage input circut coupled to said amplifier, said amplifier including first and second output load means between which a differential push-pull alternating voltage is provided in response to an alternating signal voltage input supplied to said amplifier, the magnitude and phase of said push-pull alternating voltage being functions of the magnitude and phase of said signal voltage input, a balanced circuit comprising a pair of grid-controlled vacuum tubes having coupled cathodes, said pair of vacuum tubes having respective plate electrodes coupled to said first and second output load means of said paraphase amplifier, respectively, for receiving the differential push-pull alternating voltage therefrom, a balanced circuit having points on opposite sides of an electrical mid-point thereof coupled to respective control grids of said pair of vacuum tubes with electrical mid-point being connected to the cathodes of said vacuum tubes for supplying an alternating push-pull voltage to said grids of a frequency corresponding to the frequency of said alternating signal voltage, and cathode load means between said electrical mid-point at the coupled cathodes of said tubes and ground for providing a unidirectional output voltage whose magnitude is a function of the magnitude of said alternating signal voltage input and whose polarity relative to a voltage output with no signal voltage supplied is a function of the relative phases of said alternating signal voltage and said push-pull alternating voltage.

9. In combination, a pair of vacuum tubes each having a plate, grid and cathode, means coupling the cathodes of said tubes to ground through common impedance means, means for supplying the plates of said tubes with substantially equal quiescent plate voltages so that current flow through each tube is substantially the same, means coupled to the grids of said tubes for supplying a push-pull switching voltage of predetermined frequency thereto for alternately cutting current flow in each of said tubes on and off for predetermined time intervals so that one tube is conducting while the other is non-conducting, said last-named means having an electrical mid-point connected to the junction of said cathode and common impedance means therefor, and means coupled to the plates of said tubes for changing their voltages in opposite directions from each other in response to a signal voltage supplied to said last-named means.

10. In combination, a cathode-coupled paraphase amplifier having first and second output circuits for providing first and second output voltages, respectively, of substantially equal value with zero signal voltage input supplied to said amplifier, a pair of cathode-coupled vacuum tubes each having a plate, grid, and cathode, means coupling the plates of said tubes to said first and second output circuits of said amplifier, means coupled to the grids of said vacuum tubes for supplying a push-pull switching voltage thereto, said last-named means having an electrical mid-point connected to the cathodes of said vacuum tubes, and impedance means connected to the coupled cathodes of said vacuum tubes between said electrical mid-point and ground for providing a single-ended output circuit.

References Cited in the file of this patent

UNITED STATES PATENTS

| | | |
|---|---|---|
| 1,926,875 | Llewellyn | Sept. 12, 1933 |
| 2,078,152 | Moyer | Apr. 20, 1937 |
| 2,329,073 | Mitchell et al. | Sept. 7, 1943 |
| 2,482,759 | Goodrich et al. | Sept. 27, 1949 |
| 2,577,668 | Wilmotte et al. | Dec. 4, 1951 |